United States Patent
Fukuhara

(10) Patent No.: US 8,723,359 B2
(45) Date of Patent: May 13, 2014

(54) METHOD FOR CONTROLLING SODIUM-SULFUR BATTERY

(75) Inventor: Motohiro Fukuhara, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 104 days.

(21) Appl. No.: 13/038,609

(22) Filed: Mar. 2, 2011

(65) Prior Publication Data

US 2011/0200852 A1     Aug. 18, 2011

Related U.S. Application Data

(63) Continuation of application No. PCT/JP2009/066611, filed on Sep. 25, 2009.

(60) Provisional application No. 61/101,167, filed on Sep. 30, 2008.

(51) Int. Cl.
H01M 10/42     (2006.01)

(52) U.S. Cl.
USPC ............. 307/51; 307/43; 307/44; 307/46; 307/80; 307/81; 307/85; 429/61; 429/123; 320/119; 320/121; 320/135

(58) Field of Classification Search
USPC ......... 307/11–87; 429/61, 123; 320/119, 121, 320/135
See application file for complete search history.

(56) References Cited

U.S. PATENT DOCUMENTS

| | | | |
|---|---|---|---|
| 6,747,370 B2 * | 6/2004 | Abe | 307/66 |
| 6,924,567 B2 * | 8/2005 | Killian et al. | 307/46 |
| 2008/0076010 A1 | 3/2008 | Sato | |
| 2008/0224541 A1 * | 9/2008 | Fukuhara | 307/48 |

FOREIGN PATENT DOCUMENTS

| | | | |
|---|---|---|---|
| EP | 1 912 305 A1 | 4/2008 | |
| JP | 2002-017044 A1 | 1/2002 | |
| JP | 2003-317808 A1 | 11/2003 | |
| JP | 2008-084677 A1 | 4/2008 | |
| JP | 2008-104284 * | 5/2008 | H02J 3/32 |
| JP | 2008-104284 A1 | 5/2008 | |

OTHER PUBLICATIONS

U.S. Appl. No. 13/038,618, filed Mar. 2, 2011, Fukuhara, Motohiro.
U.S. Appl. No. 13/039,709, filed Mar. 3, 2011, Fukuhara, Motohiro.
Extended European Search Report dated Jun. 15, 2012.
European Office Action, European Application No. 09817697.7, dated Nov. 11, 2013 (4 pages).

* cited by examiner

*Primary Examiner* — Ula C Ruddock
*Assistant Examiner* — Amanda Barrow
(74) *Attorney, Agent, or Firm* — Burr & Brown, PLLC

(57) ABSTRACT

A plurality of sodium-sulfur batteries are divided into a plurality of groups. Power to be input or output, which is assigned to all sodium-sulfur batteries in order to compensate for fluctuations of output power of a power generation device, is distributed to each group. The plurality of sodium-sulfur batteries divided in the groups are periodically rotated. This enables a uniform utilization rate of the sodium-sulfur batteries to be achieved.

4 Claims, 2 Drawing Sheets

METHOD FOR CONTROLLING SODIUM-SULFUR BATTERY

FIELD OF THE INVENTION

The present invention relates to a method for controlling sodium-sulfur batteries, in an interconnected system in which a power generation device that fluctuates in output, such as a wind power generation device, and an electric power storage-compensation device that includes a plurality of sodium-sulfur batteries are combined to supply power to an electric power system.

BACKGROUND OF THE INVENTION

In recent years, a natural energy power generation device for generating power from wind, solar power, geothermal heat, or the like has attracted attention and been put to practical use. The natural energy power generation device is a clean power generation device that does not use any limited resource such as oil but uses an energy resource present in unlimited quantity in nature, and can suppress carbon dioxide emissions. Hence, the natural energy power generation device has been increasingly introduced by companies, governments, and the like, for prevention of global warming.

However, since energy coming from nature varies from moment to moment, output fluctuations are unavoidable in the natural energy power generation device. This poses an obstacle to widespread use of the natural energy power generation device. To remove this obstacle, in the case of employing the natural energy power generation device, it is preferable to build an interconnected (power generation) system that combines the natural energy power generation device with an electric power storage-compensation device having a plurality of sodium-sulfur batteries (secondary batteries) as a main component.

A sodium-sulfur battery has features such as a high energy density, an ability to produce high output in a short time, and an excellent high-speed response. Accordingly, when a bidirectional converter for controlling charge and discharge is added, the sodium-sulfur battery offers an advantage that output fluctuations of the natural energy power generation device which can occur on the order of several hundred milliseconds to several seconds can be compensated. Therefore, the interconnected system in which the natural energy power generation device is combined with the electric power storage-compensation device having the plurality of sodium-sulfur batteries as the component is a desirable power generation system.

SUMMARY OF THE INVENTION

When used in load leveling, the electric power storage-compensation device having the plurality of sodium-sulfur batteries as the component is operated in such a manner that all sodium-sulfur batteries continuously discharge to reach a discharge end, and then continuously charge to reach a charge end (full charge). Accordingly, a utilization rate does not vary much among the sodium-sulfur batteries.

On the other hand, the interconnected system in which the natural energy power generation device is combined with the electric power storage-compensation device having the plurality of sodium-sulfur batteries as the component functions to compensate for fluctuations of the natural energy power generation device, in order to achieve a smooth or completely flat output (as the interconnected system) according to an operation plan (power generation plan) designated by a human, a computer, or the like. Therefore, the sodium-sulfur batteries are operated in such a manner as to frequently repeat charge and discharge, and controlled so as not to reach a charge end or a discharge end.

In the case of maintaining the power generation plan by a plurality of electric power storage-compensation devices, when the plan value and the natural energy power generation device have a large deviation (a state in which the plan value and power generated by natural energy are apart from each other), all of the plurality of electric power storage-compensation devices are operated. When the deviation is small (a state in which the plan value and the power generated by natural energy approach each other), however, an unnecessary unit (electric power storage-compensation device including a sodium-sulfur battery) of the plurality of electric power storage-compensation devices is not operated and only a few units are operated, or overall balance is adjusted by increasing a control quantity of one unit and decreasing a control quantity of another unit among the plurality of electric power storage-compensation devices. This can lead to a variation in utilization rate among individual sodium-sulfur batteries.

When the utilization rate varies among sodium-sulfur batteries, only a sodium-sulfur battery with a high utilization rate deteriorates fast. This makes it substantially difficult to perform quality management (deterioration prediction) of sodium-sulfur batteries by the number of years in operation. There is also a possibility that a residual capacity (battery depth) of a sodium-sulfur battery unexpectedly drops due to progress of deterioration. This is undesirable for prolonged operation of the interconnected system.

The present invention has been made in view of such circumstances, and has an object of providing a means for, in an interconnected system combining a natural energy power generation device that fluctuates in output and an electric power storage-compensation device that has a plurality of sodium-sulfur batteries as a component, attaining a uniform utilization rate of the sodium-sulfur batteries. As a result of repeated studies, it has been found that the problem stated above can be solved by grouping the plurality of sodium-sulfur batteries beforehand and automatically rotating them periodically. In detail, the following means is provided according to the present invention.

That is, according to the present invention, there is provided a method for controlling a plurality of sodium-sulfur batteries that, in an interconnected system in which a power generation device that fluctuates in output power and an electric power storage-compensation device are combined to supply power to an electric power system, are each included in the electric power storage-compensation device and compensate for fluctuations of the output power of the power generation device, the method including: dividing the plurality of sodium-sulfur batteries into a plurality of groups; distributing power to be input or output, to each group, the power being assigned to all sodium-sulfur batteries in order to compensate for the fluctuations of the output power of the power generation device; and periodically rotating the plurality of sodium-sulfur batteries divided in the groups.

Rotating means that the individual sodium-sulfur batteries constituting the plurality of sodium-sulfur batteries are divided into groups in rotation. In detail, the grouping is changed or sodium-sulfur batteries are replaced with each other so that, in a predetermined long period (e.g., in unit of one year), the individual sodium-sulfur batteries constituting the plurality of sodium-sulfur batteries belong to a specific group for the same length of time.

It is desirable to perform the periodical rotation within one month. For example, the rotation may be performed every week, every 10 days, every two weeks, every month, or the like. In the sodium-sulfur battery control method according to the present invention, it is preferable that the rotation is performed every 10 days.

In the sodium-sulfur battery control method according to the present invention, it is preferable that the number of sodium-sulfur batteries belonging to each group is changed.

The sodium-sulfur battery control method according to the present invention is particularly suitable when the power generation device that fluctuates in output is a natural energy power generation device that uses natural energy of at least one of wind, solar power, and geothermal heat.

The sodium-sulfur battery control method according to the present invention is a method for controlling a plurality of sodium-sulfur batteries that, in an interconnected system in which a power generation device that fluctuates in output and an electric power storage-compensation device are combined to supply power to an electric power system, are each included in the electric power storage-compensation device. In this specification, an individual (one) sodium-sulfur battery constituting the plurality of sodium-sulfur batteries denotes a sodium-sulfur battery that is separated from other sodium-sulfur batteries in unit of control, and is not determined by the number of cells, the number of module batteries, an output magnitude, and the like. In detail, in the case where a sodium-sulfur battery composes the electric power storage-compensation device, a sodium-sulfur battery under control of one bidirectional converter is treated as one sodium-sulfur battery (though a plurality of sodium-sulfur batteries 3 are shown in each of No. 1 to No. n in FIG. 1 described later, an expression such as "No. 1 sodium-sulfur battery 3" is used to treat the plurality of sodium-sulfur batteries 3 as one No. 1 sodium-sulfur battery 3). It is desirable that all sodium-sulfur batteries have the same rated capacity, though the rated capacity need not necessarily be the same.

In the sodium-sulfur battery control method according to the present invention, the plurality of sodium-sulfur batteries are divided into a plurality of groups. Power to be input or output, which is assigned to all sodium-sulfur batteries in order to compensate for fluctuations of output power of the power generation device, is distributed to each group. Moreover, the plurality of sodium-sulfur batteries divided in the groups are periodically rotated. As a result, an increase in utilization rate of a specific sodium-sulfur battery is suppressed, so that a uniform utilization rate can be attained.

In this specification, a utilization rate of a sodium-sulfur battery means an extent to which the sodium-sulfur battery is used among the plurality of sodium-sulfur batteries. In detail, the utilization rate of the sodium-sulfur battery is relatively determined through cycle number comparison. For example, with regard to discharge, a cycle number is a number obtained by dividing a total electric quantity (integrated quantity) discharged by the sodium-sulfur battery since operation start, by a rated electric quantity (capacity).

If the utilization rate is made uniform among all of the plurality of sodium-sulfur batteries by the sodium-sulfur battery control method according to the present invention, there is no possibility that a residual capacity (unchargeable zone (capacity) even when charged) of a specific sodium-sulfur battery unexpectedly increases. Therefore, a problem of reducing an operation range as a sodium-sulfur battery (electric power storage-compensation device) for compensating for output fluctuations of the natural energy power generation device is unlikely to occur. Hence, output fluctuations of the natural energy power generation device can be continuously compensated over a long period of time, by the electric power storage-compensation device that uses the sodium-sulfur batteries controlled by the sodium-sulfur battery control method according to the present invention. This contributes to significantly improved reliability of the interconnected system in prolonged operation.

The sodium-sulfur battery control method according to the present invention can be utilized as a method for controlling, in an interconnected system in which a power generation device that uses natural energy such as wind, solar power, geothermal heat, or the like and fluctuates in output and an electric power storage-compensation device are combined to supply power to an electric power system, a plurality of sodium-sulfur batteries included in the electric power storage-compensation device.

DETAILED DESCRIPTION OF THE INVENTION

Figure 1:
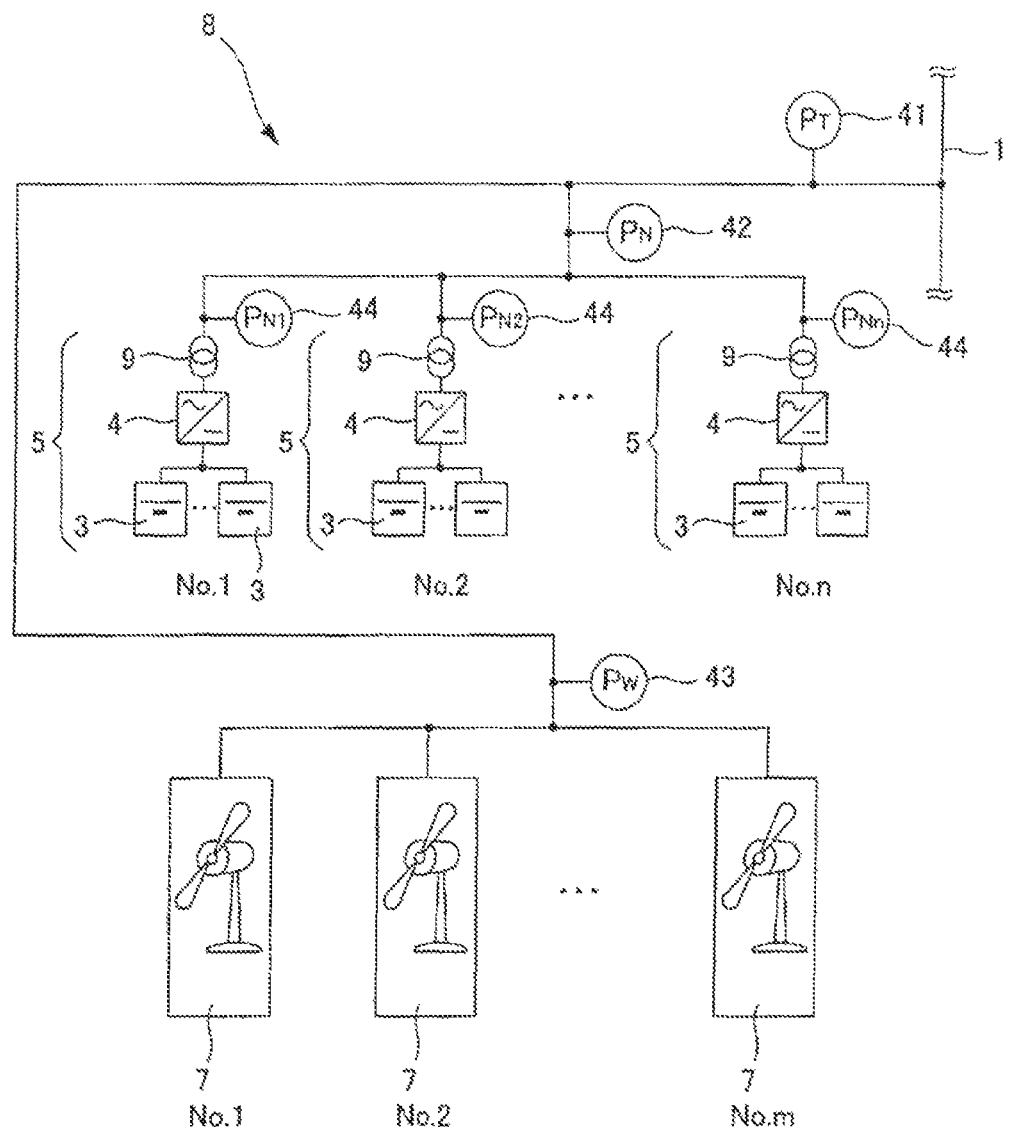
FIG. 1 is a system configuration diagram showing an example of an interconnected system including a power generation device that fluctuates in output and an electric power storage-compensation device.

The following describes an embodiment of the present invention, with reference to drawings according to need. It is to be understood that the present invention is not limited to the embodiment, and various changes, modifications, improvements, and replacements may be made on the basis of knowledge of a person skilled in the art without departing from the scope of the present invention. For example, though the drawings represent a preferred embodiment of the present invention, the present invention is not limited to the mode and information shown in the drawings. In order to implement or verify the present invention, means identical or equivalent to those described in this specification may be applied, and means described below are preferred means.

An interconnected system is described first. A system configuration diagram shown in FIG. 1 represents an example of an interconnected system including a power generation device that fluctuates in output and an electric power storage-compensation device. An interconnected system 8 shown in FIG. 1 includes a wind power generation device 7 (natural energy power generation device) that turns a power generator by converting wind power into windmill rotation, and an electric power storage-compensation device 5. The electric power storage-compensation device 5 includes a sodium-sulfur battery 3 (also written as a NAS battery) which is a secondary battery capable of storing and outputting power, a bidirectional converter 4 having a dc/ac conversion function, and a transformer 9. For example, the bidirectional converter 4 may be composed of a chopper and an inverter, or composed of an inverter. The interconnected system 8 has m systems of the wind power generation device 7, i.e., No. 1 to No. m (m is an integer larger than 1) and n systems of the sodium-sulfur battery 3 (the electric power storage-compensation device 5), i.e., No. 1 to No. n (n is an integer larger than 1).

As mentioned earlier, sodium-sulfur batteries 3 included in one electric power storage-compensation device 5 are treated as one sodium-sulfur battery 3 as a whole. Moreover, a typical interconnected system includes a private power generator as a power generation device and a sodium-sulfur battery heater and other auxiliary machines as a load, but they are omitted in the interconnected system 8. In the sodium-sulfur battery control method according to the present invention, they can be regarded as being included (added or subtracted) in power generated by the power generation device (the wind power generation device 7) that fluctuates in output.

In the interconnected system 8, the sodium-sulfur battery 3 is discharged in the electric power storage-compensation device 5, and power $P_N$ measured by a power meter 42 compensates for output fluctuations of power (power $P_W$ measured by a power meter 43) generated by the wind power generation device 7. In detail, by controlling the discharge (i.e., power $P_N$) of the sodium-sulfur battery 3 so that power (power $P_T$ measured by a power meter 41) output from the interconnected system 8 as a whole satisfies "$P_T = P_W + P_N$ = constant" ($P_N = P_T - P_W$), stable power of high quality is output as power $P_T$ from the whole interconnected system 8, and supplied, for example, to an electric power system 1 between a distributing substation and a consumer of electricity.

Moreover, in the interconnected system 8, the sodium-sulfur battery 3 is charged in the electric power storage-compensation device 5, in accordance with output fluctuations of power $P_W$ generated by the wind power generation device 7. In detail, by controlling the charge (i.e., power $-P_N$) of the sodium-sulfur battery 3 so that power $P_N$ measured by the power meter 42 is "$P_N = -P_W$", fluctuating power $P_W$ is consumed, as a result of which power $P_T$ output from the whole interconnected system 8 can be brought to 0.

In either of the case of charging the sodium-sulfur battery 3 and the case of discharging the sodium-sulfur battery 3, the sodium-sulfur battery 3 is charged or discharged by changing a control target value of the bidirectional converter 4 in the electric power storage-compensation device 5 based on the output (power $P_W$) of the wind power generation device 7 so that power for compensating for the output is input or output, thereby absorbing output fluctuations of the wind power generation device 7. Since stable power of high quality can be supplied by using the natural energy power generation device (the wind power generation device 7) that emits almost no carbon dioxide and the sodium-sulfur battery 3 (the electric power storage-compensation device 5), the interconnected system 8 is a favorable power generation system.

Figure 2:
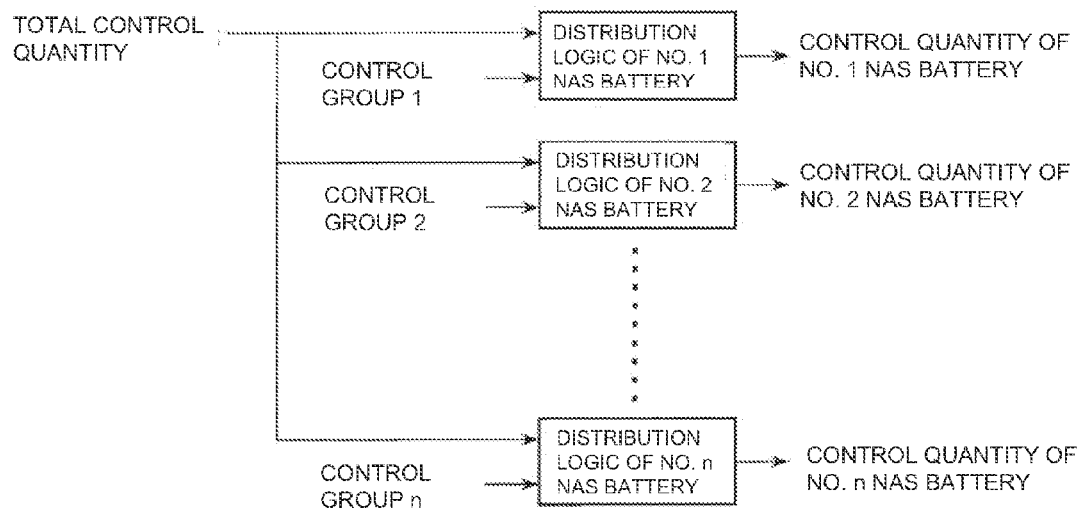
FIG. 2 is a block diagram showing a logic of distributing a total control quantity assigned to all sodium-sulfur batteries in the interconnected system, to each sodium-sulfur battery.
Figure 3:
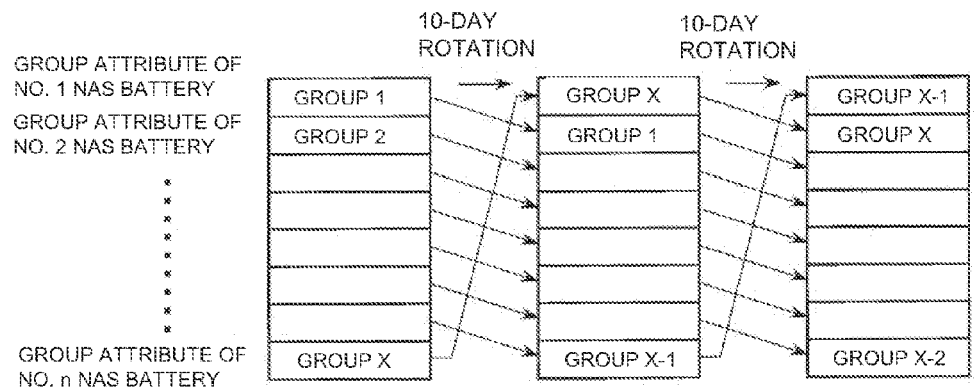
FIG. 3 is a diagram explaining a mode of periodically rotating the plurality of sodium-sulfur batteries divided in groups.

The following describes, with reference to FIGS. 2 and 3, a method of dividing the plurality of sodium-sulfur batteries 3 into groups 1 to x and distributing input/output power, and a method of periodically rotating the plurality of sodium-sulfur batteries divided in the groups, in the interconnected system 8 shown in FIG. 1.

In the interconnected system 8, the plurality of sodium-sulfur batteries 3 of No. 1 to No. n are divided into groups 1 to x. As shown in FIG. 2, a total control quantity assigned to all sodium-sulfur batteries 3 in the interconnected system 8 is distributed into a control quantity for each sodium-sulfur battery 3 of No. 1 to No. n (control quantity of No. 1 to No. n NAS battery (unit)), by a corresponding distribution logic.

An example of the distribution logic is a logic of distributing the total control quantity assigned to the sodium-sulfur batteries 3 according to a level of power to be input or output and a control mode. For instance, the total control quantity may be distributed into the control quantity assigned to each sodium-sulfur battery 3 of No. 1 to No. n, according to a difference in control method such as controlling the sodium-sulfur battery 3 by constant power without depending on output fluctuations of the wind power generation device 7, controlling the sodium-sulfur battery 3 following output fluctuations of the wind power generation device 7, or stopping the sodium-sulfur battery 3. Control groups 1, 2, . . . , n shown in FIG. 2 are groups defined by such a difference in (for example) control method, and are different in meaning from the groups into which the plurality of sodium-sulfur batteries 3 are divided. When the above-mentioned example is used in FIG. 2, for instance, control group 1 controls the sodium-sulfur battery 3 (e.g., No. 1 sodium-sulfur battery 3) by constant power without depending on output fluctuations of the wind power generation device 7 (i.e., distributes a control quantity so as to achieve such control), control group 2 controls the sodium-sulfur battery 3 (e.g. No. 2 sodium-sulfur battery 3) following output fluctuations of the wind power generation device 7 (i.e., distributes a control quantity so as to achieve such control), and control group 3 stops the sodium-sulfur battery 3 (e.g. No. 3 sodium-sulfur battery 3) (i.e., distributes a control quantity so as to achieve such control, the control quantity being 0 in the case of stop).

FIG. 3 is a diagram explaining a mode of periodically rotating the sodium-sulfur batteries 3 of No. 1 to No. n divided in groups 1 to x, every 10 days. In the mode shown in FIG. 3, after 10 days, original group x is changed to an attribute of original group 1, original group 1 is changed to an attribute of original group 2, and the same is repeated for the succeeding groups. This is performed every 10 days. Thus, as the group attribute changes, the distributed control quantity changes accordingly.

For example, suppose fixed control is performed in such a manner that No. 1 sodium-sulfur battery 3 is controlled by constant power without depending on output fluctuations of the wind power generation device 7 (i.e., a control quantity is distributed so as to achieve such control), No. 2 sodium-sulfur battery 3 is controlled following output fluctuations of the wind power generation device 7 (i.e., a control quantity is distributed so as to achieve such control), and No. 3 sodium-sulfur battery 3 is stopped. In this case, the utilization rate varies among the sodium-sulfur batteries 3, and deterioration of only a sodium-sulfur battery 3 of a high utilization rate is accelerated. However, by periodically rotating the sodium-sulfur batteries 3 divided in groups, an increase in utilization rate of a specific sodium-sulfur battery 3 is suppressed, which contributes to a uniform utilization rate. As a result, a situation where deterioration of only a specific sodium-sulfur battery 3 is accelerated can be prevented.

In the example shown in FIGS. 2 and 3, each sodium-sulfur battery 3 of No. 1 to No. n is treated as one group, where the distributed control quantity and the sodium-sulfur battery 3 are in a one-to-one correspondence with each other, and also the sodium-sulfur battery 3 and the (division) group are in a one-to-one correspondence with each other. Alternatively, a plurality of sodium-sulfur batteries 3 of different control units may be treated as one group. As an example, three sodium-sulfur batteries 3 of No. 1, No. 2, and No. 3 may be treated as one group, to which one control quantity is distributed and also (for example) the attribute of group 1 is given.

INDUSTRIAL APPLICABILITY

The present invention is suitably used as a method for controlling sodium-sulfur batteries, in an interconnected system in which a power generation device that fluctuates in output, such as a wind power generation device, and an electric power storage-compensation device that includes a plurality of sodium-sulfur batteries are combined to supply power to an electric power system.

DESCRIPTION OF REFERENCE NUMERALS

1: electric power system
3: sodium-sulfur battery
4: bidirectional converter
5: electric power storage-compensation device
7: wind power generation device
8: interconnected system
9: transformer
41, 42, 43, 44: power meter

The invention claimed is:

1. A method for controlling a plurality of sodium-sulfur batteries that, in an interconnected system in which a power generation device that fluctuates in output power and a plurality of electric power storage-compensation devices are combined to supply power to an electric power system, are each included in one of the plurality of the electric power storage-compensation devices and compensate for fluctuations of the output power of the power generation device, the method comprising:

dividing the plurality of sodium-sulfur batteries in the plurality of power storage-compensation devices into three or more groups according to a difference in control method;

setting the difference in the control method of the groups to one of a constant power control, which controls the sodium-sulfur battery by constant power without depending on output fluctuations of the power generation device, a following control, which controls the sodium-sulfur battery following output fluctuations of the power generation device, and a stop, wherein at least one group is set to the constant power control, at least one group is set to the following control and at least one group is set to the stop, wherein a control target value of a bidirectional converter of each group of power storage-compensation devices changes the control method set for the group and changes a level of power to be input to or output from a group of power storage-compensation devices;

distributing power to be input or output, to or from each group based on the difference in the control method set, the power being assigned to all sodium-sulfur batteries in order to compensate for the fluctuations of the output power of the power generation device; and periodically rotating the control method of the plurality of sodium-sulfur batteries divided in the groups to achieve a uniform utilization rate of the sodium-sulfur batteries.

2. The method for controlling a plurality of sodium-sulfur batteries according to claim 1, wherein the rotation is performed every 10 days.

3. The method for controlling a plurality of sodium-sulfur batteries according to claim 1, wherein the power generation device that fluctuates in output is a natural energy power generation device that uses natural energy of at least one of wind, solar power, and geothermal heat.

4. The method for controlling a plurality of sodium-sulfur batteries according to claim 2, wherein the power generation device that fluctuates in output is a natural energy power generation device that uses natural energy of at least one of wind, solar power, and geothermal heat.

* * * * *